US010078396B2

(12) United States Patent
Chang et al.

(10) Patent No.: US 10,078,396 B2
(45) Date of Patent: Sep. 18, 2018

(54) OPTICAL TOUCH SENSING DEVICE AND TOUCH SIGNAL DETERMINATION METHOD THEREOF

(71) Applicant: Wistron Corporation, New Taipei (TW)

(72) Inventors: Chun-Chao Chang, New Taipei (TW); Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 122 days.

(21) Appl. No.: 14/586,982

(22) Filed: Dec. 31, 2014

(65) Prior Publication Data

US 2016/0085373 A1    Mar. 24, 2016

(30) Foreign Application Priority Data

Sep. 18, 2014  (TW) .................................. 103132254

(51) Int. Cl.
*G06F 3/042*     (2006.01)
*G06F 3/041*     (2006.01)
*G06F 3/03*      (2006.01)

(52) U.S. Cl.
CPC .......... *G06F 3/0418* (2013.01); *G06F 3/0421* (2013.01); *G06F 3/0428* (2013.01); *G06F 3/0304* (2013.01); *G06F 3/041* (2013.01); *G06F 3/042* (2013.01); *G06F 3/0425* (2013.01); *G06F 2203/04104* (2013.01); *G06F 2203/04109* (2013.01)

(58) Field of Classification Search
CPC .......... G06F 3/041; G06F 2203/04104; G06F 3/0421; G06F 3/042; G06F 3/0428; G06F 3/0425; G06F 2203/04109; G06F 3/0304
USPC .......................................................... 345/175
See application file for complete search history.

(56) References Cited

U.S. PATENT DOCUMENTS

| 8,059,102 | B2 * | 11/2011 | Rimon | ..................... G06F 3/044 341/33 |
| 8,077,147 | B2 * | 12/2011 | Krah | ....................... G06F 3/016 345/163 |
| 8,350,831 | B2 * | 1/2013 | Drumm | ................. G06F 3/0421 345/173 |
| 8,531,435 | B2 * | 9/2013 | Drumm | .................. G06F 3/042 345/156 |

(Continued)

*Primary Examiner* — Michael J Jansen, II
(74) *Attorney, Agent, or Firm* — JCIPRNET

(57) ABSTRACT

An optical touch sensing device and a touch signal determining method thereof are provided. The optical touch sensing device includes a light source module, at least one image capturing element and a processing unit. The light source module disposed on a touch surface provides a detecting light to the touch surface. The image capturing element captures an optical touch data along the touch surface based on the detecting light. The processing unit recognizes the optical touch data according to a recognition threshold to obtain multiple touch signals. When a object spacing between the touch signals is no bigger than a palm spacing, the processing unit compares the covering parameters corresponding to the touch signals to select a largest covering parameter among the covering parameters, and determines whether to ignore the touch signal corresponding to the largest covering parameter according to the largest covering parameter and an area threshold.

11 Claims, 6 Drawing Sheets

(56) References Cited

U.S. PATENT DOCUMENTS

| | | | | |
|---|---|---|---|---|
| 8,553,014 B2* | 10/2013 | Holmgren | G06F 3/0421 | 345/173 |
| 8,660,978 B2* | 2/2014 | Hinckley | G06F 3/038 | 706/52 |
| 8,674,966 B2* | 3/2014 | Jansson | G06F 3/042 | 345/169 |
| 8,676,007 B2* | 3/2014 | Holmgren | G06F 3/0421 | 359/642 |
| 8,723,839 B2* | 5/2014 | Drumm | G06F 3/0421 | 178/18.09 |
| 8,723,840 B2* | 5/2014 | Drumm | G06F 3/0421 | 178/18.09 |
| 8,837,882 B2* | 9/2014 | Holmgren | G06F 3/0421 | 359/642 |
| 8,989,536 B2* | 3/2015 | Holmgren | G06F 3/0421 | 385/33 |
| 9,035,917 B2* | 5/2015 | Jansson | G06F 3/042 | 345/175 |
| 9,052,777 B2* | 6/2015 | Holmgren | G06F 3/042 | |
| 9,063,615 B2* | 6/2015 | Drumm | G06F 3/0416 | |
| 9,069,417 B2* | 6/2015 | Rimon | G06F 3/038 | |
| 9,075,461 B2* | 7/2015 | Wang | G06F 3/041 | |
| 9,092,091 B2* | 7/2015 | Piot | G06F 3/042 | |
| 9,092,092 B2* | 7/2015 | Drumm | G06F 3/0421 | |
| 9,158,416 B2* | 10/2015 | Eriksson | G06F 3/0421 | |
| 9,207,802 B2* | 12/2015 | Um | G06F 3/044 | |
| 9,244,545 B2* | 1/2016 | Hinckley | G06F 3/038 | |
| 9,244,551 B2* | 1/2016 | Han | G06F 3/041 | |
| 9,256,315 B2* | 2/2016 | Tsai | G06F 3/0416 | |
| 9,335,864 B2* | 5/2016 | Drumm | G06F 3/0421 | |
| 9,335,867 B2* | 5/2016 | Holmgren | G06F 3/0421 | |
| 9,342,190 B2* | 5/2016 | Lu | G06F 3/0428 | |
| 9,383,864 B2* | 7/2016 | Morrison | G06F 3/0421 | |
| 9,411,430 B2* | 8/2016 | Holmgren | G06F 3/0421 | |
| 9,552,104 B2* | 1/2017 | Drumm | G06F 3/0421 | |
| 9,557,852 B2* | 1/2017 | Tsai | G06F 3/0416 | |
| 9,671,900 B2* | 6/2017 | Piot | G06F 3/042 | |
| 9,778,794 B2* | 10/2017 | Jansson | G06F 3/0421 | |
| 9,791,976 B2* | 10/2017 | Drumm | G06F 3/0421 | |
| 9,811,163 B2* | 11/2017 | Eriksson | G06F 3/0421 | |
| 9,965,101 B2* | 5/2018 | Drumm | G06F 3/0421 | |
| 2007/0152966 A1* | 7/2007 | Krah | G06F 3/016 | 345/163 |
| 2007/0285404 A1* | 12/2007 | Rimon | G06F 3/0416 | 345/173 |
| 2008/0012835 A1* | 1/2008 | Rimon | G06F 3/038 | 345/173 |
| 2010/0207910 A1* | 8/2010 | Liu | G06F 3/0416 | 345/175 |
| 2011/0012855 A1* | 1/2011 | Yeh | G06F 3/0416 | 345/173 |
| 2011/0157096 A1* | 6/2011 | Drumm | G06F 3/0421 | 345/175 |
| 2011/0199338 A1* | 8/2011 | Kim | G06F 3/0418 | 345/175 |
| 2011/0241984 A1* | 10/2011 | Morrison | G06F 3/0421 | 345/157 |
| 2011/0242005 A1* | 10/2011 | Ung | G06F 3/03545 | 345/173 |
| 2011/0242038 A1* | 10/2011 | Kakuta | G06F 3/0418 | 345/173 |
| 2011/0267264 A1* | 11/2011 | McCarthy | G06F 3/017 | 345/157 |
| 2012/0032891 A1* | 2/2012 | Parivar | G06F 3/04883 | 345/173 |
| 2012/0075255 A1* | 3/2012 | Krah | G06F 3/016 | 345/175 |
| 2012/0158629 A1* | 6/2012 | Hinckley | G06F 3/038 | 706/15 |
| 2012/0176343 A1* | 7/2012 | Holmgren | G06F 3/042 | 345/175 |
| 2012/0188205 A1* | 7/2012 | Jansson | G06F 3/042 | 345/175 |
| 2012/0188206 A1* | 7/2012 | Sparf | G06F 3/042 | 345/175 |
| 2012/0212457 A1* | 8/2012 | Drumm | G06F 3/0416 | 345/175 |
| 2012/0212458 A1* | 8/2012 | Drumm | G06F 3/042 | 345/175 |
| 2012/0218229 A1* | 8/2012 | Drumm | G06F 3/0421 | 345/175 |
| 2012/0262407 A1* | 10/2012 | Hinckley | G06F 3/038 | 345/173 |
| 2012/0293454 A1* | 11/2012 | Tsai | G06F 3/0416 | 345/174 |
| 2013/0076670 A1* | 3/2013 | Wu | G06F 3/044 | 345/173 |
| 2013/0127788 A1* | 5/2013 | Drumm | G06F 3/0421 | 345/175 |
| 2013/0127789 A1* | 5/2013 | Drumm | G06F 3/0421 | 345/175 |
| 2013/0135232 A1* | 5/2013 | Wang | G06F 3/041 | 345/173 |
| 2013/0141395 A1* | 6/2013 | Holmgren | G06F 3/0421 | 345/175 |
| 2013/0155027 A1* | 6/2013 | Holmgren | G06F 3/0421 | 345/175 |
| 2013/0187891 A1* | 7/2013 | Eriksson | G06F 3/0421 | 345/175 |
| 2014/0071094 A1* | 3/2014 | Holmgren | G06F 3/0421 | 345/175 |
| 2014/0146249 A1* | 5/2014 | Holmgren | G06F 3/0421 | 349/12 |
| 2014/0152624 A1* | 6/2014 | Piot | G06F 3/042 | 345/175 |
| 2014/0160081 A1* | 6/2014 | Jansson | G06F 3/042 | 345/175 |
| 2014/0210792 A1* | 7/2014 | Drumm | G06F 3/0421 | 345/175 |
| 2014/0362053 A1* | 12/2014 | Holmgren | G06F 3/0421 | 345/175 |
| 2014/0368470 A1* | 12/2014 | Bastani | G06F 3/0416 | 345/175 |
| 2015/0002451 A1* | 1/2015 | Um | G06F 3/0416 | 345/174 |
| 2015/0084872 A1* | 3/2015 | Han | G06F 1/3262 | 345/173 |
| 2015/0145834 A1* | 5/2015 | Holmgren | G06F 3/0421 | 345/175 |
| 2015/0253933 A1* | 9/2015 | Lu | G06F 3/0428 | 345/175 |
| 2015/0277636 A1* | 10/2015 | Holmgren | G02B 19/0028 | 345/175 |
| 2015/0277666 A1* | 10/2015 | Jansson | G06F 3/0421 | 345/175 |
| 2016/0026250 A1* | 1/2016 | Eriksson | G06F 3/0421 | 345/175 |
| 2016/0026338 A1* | 1/2016 | Drumm | G06F 3/0421 | 345/175 |
| 2016/0034095 A1* | 2/2016 | Piot | G06F 3/042 | 345/175 |
| 2016/0062549 A1* | 3/2016 | Drumm | G06F 3/0421 | 345/175 |
| 2016/0062550 A1* | 3/2016 | Drumm | G06F 3/0421 | 345/175 |
| 2016/0085373 A1* | 3/2016 | Chang | G06F 3/0421 | 345/175 |
| 2016/0098152 A1* | 4/2016 | Drumm | G06F 3/0421 | 345/175 |
| 2016/0110017 A1* | 4/2016 | Tsai | G06F 3/0416 | 345/174 |

* cited by examiner

OPTICAL TOUCH SENSING DEVICE AND TOUCH SIGNAL DETERMINATION METHOD THEREOF

CROSS-REFERENCE TO RELATED APPLICATION

This application claims the priority benefit of Taiwan application serial no. 103132254, filed on Sep. 18, 2014. The entirety of the above-mentioned patent application is hereby incorporated by reference herein and made a part of this specification.

BACKGROUND OF THE INVENTION

1. Field of the Invention

The invention generally relates to a touch sensing device, and more particularly, to an optical touch sensing device and a method thereof for preventing an inadvertent palm touch.

2. Description of Related Art

In order for electronic devices to achieve a light, thin, short and compact appearance while allowing users to operate proper functions of the electronic devices easily, touch screens gradually become essential output and input tools for the electronic devices. When operating a touch panel on a portable electronic device (such as a mobile phone or a tablet PC), a user generally would operate the touch panel in a hand dangling manner so as to avoid the palm or other body parts from inadvertently touching the touch panel. Nevertheless, as the appearance of the electronic device becomes increasingly light and thin, a space for the user to hold the electronic device becomes smaller, and thus the user's palm may inevitably touching the touch panel and cause an inadvertent touch or misconduct.

According to working principles of a sensor, the touch panel can generally be classified into various types, such as capacitive, resistive, optical and etc. In a capacitive touch device and a resistive touch devices, there already exist technologies for determining an inadvertent palm touch through a touch area of a touch object. However, an optical touch device is different from the other touch devices in terms of sensor working principles, and is difficult to determine an inadvertent palm touch simply through the size of a covering region of a touch signal. This is because that an area occupied by an image captured by an image capturing unit in the optical touch sensing device would become smaller as a distance from the touch object to a lens of the image capturing unit becomes farther.

FIG. 1A and FIG. 1B are schematic diagrams illustrating an optical touch sensing device 100 in sensing a touch object 120 to generate a lens image 150. A distance D1 of the touch object 120 relative to an image capturing unit 210 in FIG. 1A is smaller than a distance D2 of the touch object 120 relative to the image capturing unit 210 in FIG. 1B, and the touch object 120 shown in FIG. 1A and FIG. 1B has the same size. Referring to FIG. 1A and FIG. 1B at the same time, when the image capturing unit 110 captures the lens image 150 along the touch surface 130, a covering region A1 formed by the touch object 120 in FIG. 1A would be greater than a covering region A2 formed by the touch object 120 in FIG. 1B. Since it is difficult for the optical touch sensing technology to directly use the covering region on the lens image as a judgment basis for an inadvertent palm touch, manufacturers need to find other technique to solve the problem regarding the inadvertent palm touch in the optical touch sensing device.

SUMMARY OF THE INVENTION

The invention is directed to an optical touch sensing device and a touch signal determining method thereof. The optical touch sensing device first determines whether a spacing between each of a plurality of touch signals is within a palm spacing, and then determines a width or an area covered by each of the touch signals in an optical touch data, so as to determine the touch signal with larger area as being generated by a palm or other large touch object. As a result, the optical touch sensing device may be used to determine whether there exists a condition of inadvertent palm touching, and may ignore the inadvertent touch signal.

The invention is directed to an optical touch sensing device including a light source module, at least one image capturing element and a processing unit. The light source module is disposed on a touch surface. The light source module provides a detecting light to the touch surface. The image capturing element captures an optical touch data along the touch surface based on the detecting light. The processing unit is coupled to the image capturing element to receive the optical touch data. The processing unit recognizes the optical touch data according to a recognition threshold to obtain a plurality of touch signals and a plurality of touch coordinates and a plurality of covering parameters corresponding to the touch signals. The processing unit compares whether an object spacing between the touch coordinates is smaller than or equal to a palm spacing. When the object spacing between the touch signals is smaller than or equal to the palm spacing, the processing unit compares the covering parameters corresponding to the touch signals to select a largest covering parameter among the covering parameters, and determines to ignore the touch signal corresponding to the largest covering parameter according to the largest covering parameter and an area threshold.

From another perspective, the invention is directed to a touch signal determining method of an optical touch sensing device, which includes the following steps. An optical touch data based on a detecting light is received through using at least one image capturing element. The optical touch data is recognized according to a recognition threshold to obtain a plurality of touch signals and a plurality of touch coordinates and a plurality of covering parameters corresponding to the touch signals. An object spacing between the touch coordinates is being determined on whether it is smaller than or equal to a palm spacing. When the object spacing between the touch signals is smaller than or equal to the palm spacing, the covering parameters corresponding to the touch signals are compared to select a largest covering parameter among the covering parameters; and when the largest covering parameter is greater than an area threshold, the touch signal corresponding to the largest covering parameter is ignored.

In view of the above, the optical touch sensing device provided in the embodiment of the invention determines whether a spacing between the touch signals falls within the palm spacing through the touch coordinates of the touch signals, and then determines a touch signal with larger area by using the covering widths or the covering areas occupied by the touch signals in the optical touch data, so as to determine the touch signal with larger area as being generated by a palm or other large touch object. Accordingly, the optical touch sensing device may be used to determine whether there exists a condition of inadvertent palm touching, and may ignore the inadvertent touch signal.

To make the aforementioned and other features and advantages of the application more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In order for an optical touch sensing device to determine which touch signal is generated by a palm among two or more than two touch signals, the optical touch sensing device in an embodiment of the invention first determines whether a spacing between the two touch signals exceeds a preset palm distance, and then distinguishes the touch areas of the two touch signals through regions covered by the two touch signals, so that the touch signal having the spacing less than the preset palm distance and having the larger touch area among the two touch signals may be determined as an inadvertent touch signal generated by the palm and may be ignored or cancelled. As such, the optical touch sensing device in the embodiment of the invention may determine whether there exists a condition of inadvertent palm touching among a plurality of touch signals. Details regarding the various embodiments of the invention are described as follows, and the embodiments of the invention may be suitably modified by those skilled in the art according to the following disclosure.

Figure 1A:
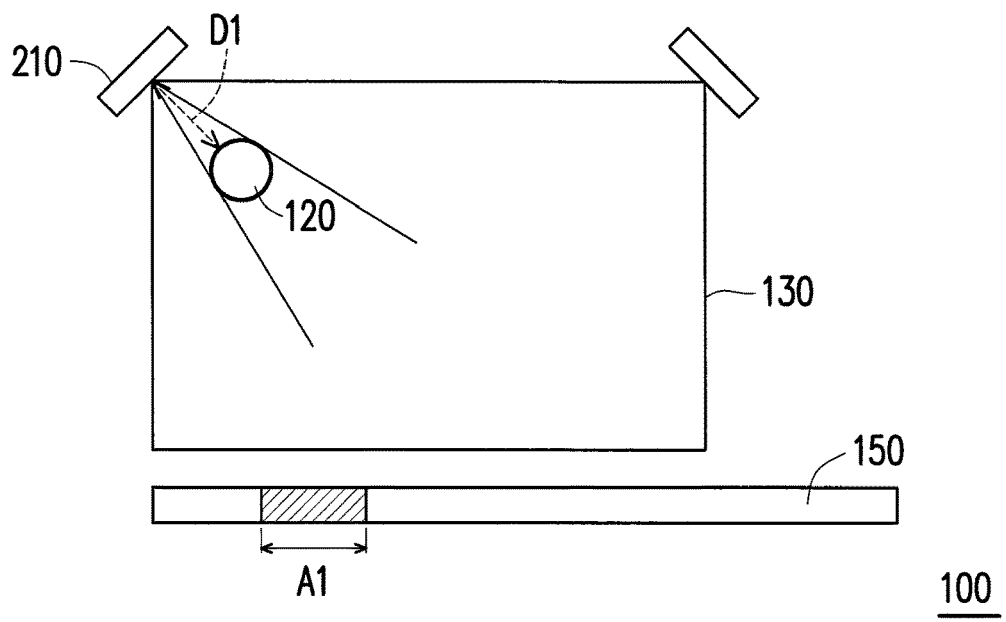
FIG. 1A and FIG. 1B are schematic diagrams illustrating an optical touch sensing device in sensing a touch object to generate a lens image.
Figure 1B:
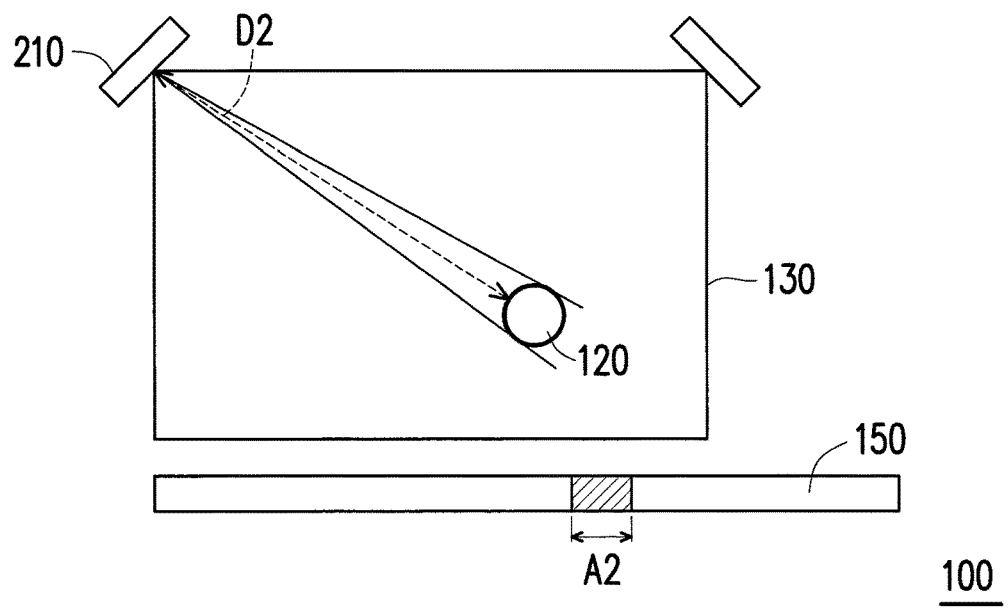
Figure 2A:
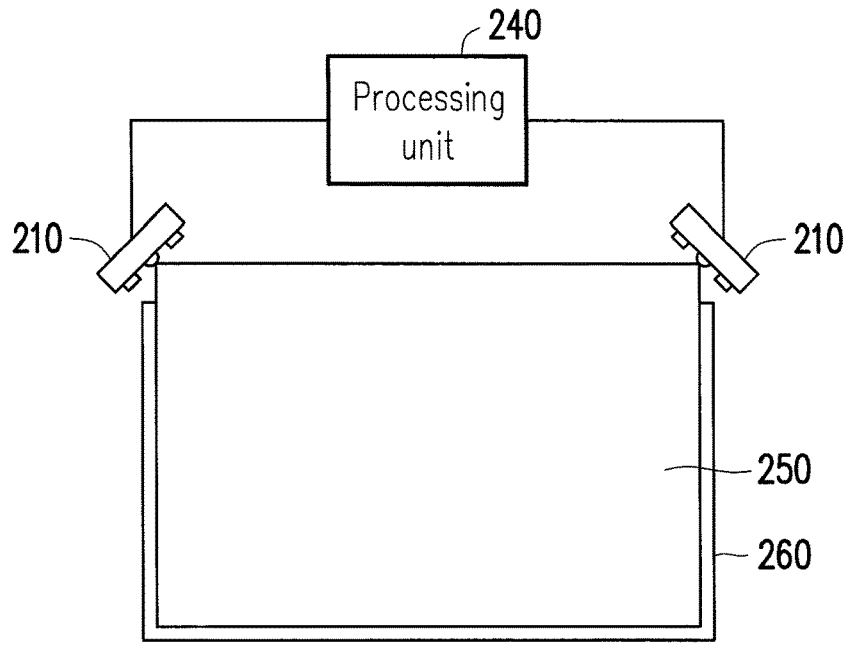
FIG. 2A and FIG. 2B are respectively a schematic diagram and a block diagram illustrating an optical touch sensing device according to an embodiment of the invention.
Figure 2B:
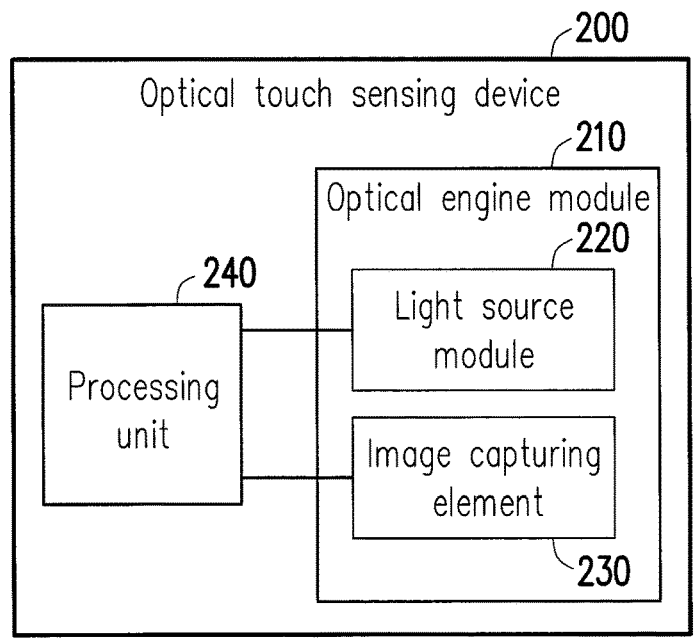

FIG. 2A and FIG. 2B are respectively a schematic diagram and a block diagram illustrating an optical touch sensing device according to an embodiment of the invention. Referring to FIG. 2A and FIG. 2B, an optical touch sensing device 200 mainly includes a light source module 220, at least one image capturing element 230 and a processing unit 240. In the present embodiment, the light source module 220 and the image capturing element 230 are integrated as an optical engine module 210, and are disposed at the periphery of a touch surface 250. The light source module 220 is controlled by the processing unit 240 to provide a detecting light to the touch surface 250. The image capturing element 230 is also controlled by the processing unit 240 to capture an image along the touch surface 250 and to capture an optical touch data (e.g., a lens image) based on the detecting light produced by the light source module 220. In the present embodiment, the optical touch sensing device 200 disposes two optical engine modules 210 around the touch surface 250. Those skilled in the art may adjust the amount of the optical engine modules 210 being used in the optical touch sensing device 200 of the present embodiment according to the needs.

The processing unit 240 may be various forms of function module, embedded system or microprocessor. The processing unit 240 is configured to be coupled to the optical engine modules 210 for controlling the light source module 220 and the image capturing element 230. The optical touch data is received through the image capturing element 230, and the optical touch data is being analyzed for performing a touch signal determining method for the optical touch sensing device 200 according to an embodiment of the invention.

The optical touch sensing device 200 further includes an edge strip 260 surrounding the touch surface 250. Depending on how the optical touch sensing device 200 detects a touch object, functions of the edge strip 260 may be different. The optical touch sensing device 200 may adopts a "touch object covering" mode to sense the touch object. The "touch object covering" mode refers to: when the optical touch sensing device 200 forms a light surface on the touch surface 250 by using the detecting light, if there is a touch object on the touch surface 250, then the light would be blocked and thus leave a shadow and a position on the optical touch data captured by the image capturing element 230. The processing unit 240 may obtain relative angles between a finger touch point and the optical lenses of the image capturing element 230, and calculate a precise location of the touch point according to a known distance between the optical lenses in combination with a triangulation method. Now, the edge strip 250 is being used to reflect the detecting light, so that the light may be reflected back to the lens of the image capturing element 230. Relatively, the optical touch sensing device 200 may also adopt a "touch object reflecting" mode to sense the touch object. The "touch object reflecting" mode refers to: when the optical touch sensing device 200 uses the image capturing element 230 to sense a light position and a light intensity after the detecting light is reflected by the touch object, the processing unit 240 then calculates the precise location of the touch point through using the light position and the light intensity of the reflected light in combination with the triangulation method. Now, the edge strip 250 is used to diverge or absorb the detecting light, thereby preventing the detecting light from being reflected back to the image capturing element 230. The optical touch sensing device 200 of the present embodiment of the invention mainly adopts the "touch object covering" mode to sense the touch object; however, those skilled in the art would be able to easily analogize the optical touch sensing device adopting the "touch object reflecting" mode based on the disclosure of the present embodiment. In the present embodiment, a width of the edge strip may be suitably adjusted according to the touch surface 250, and is generally about 3 to 5 mm.

Figure 3:
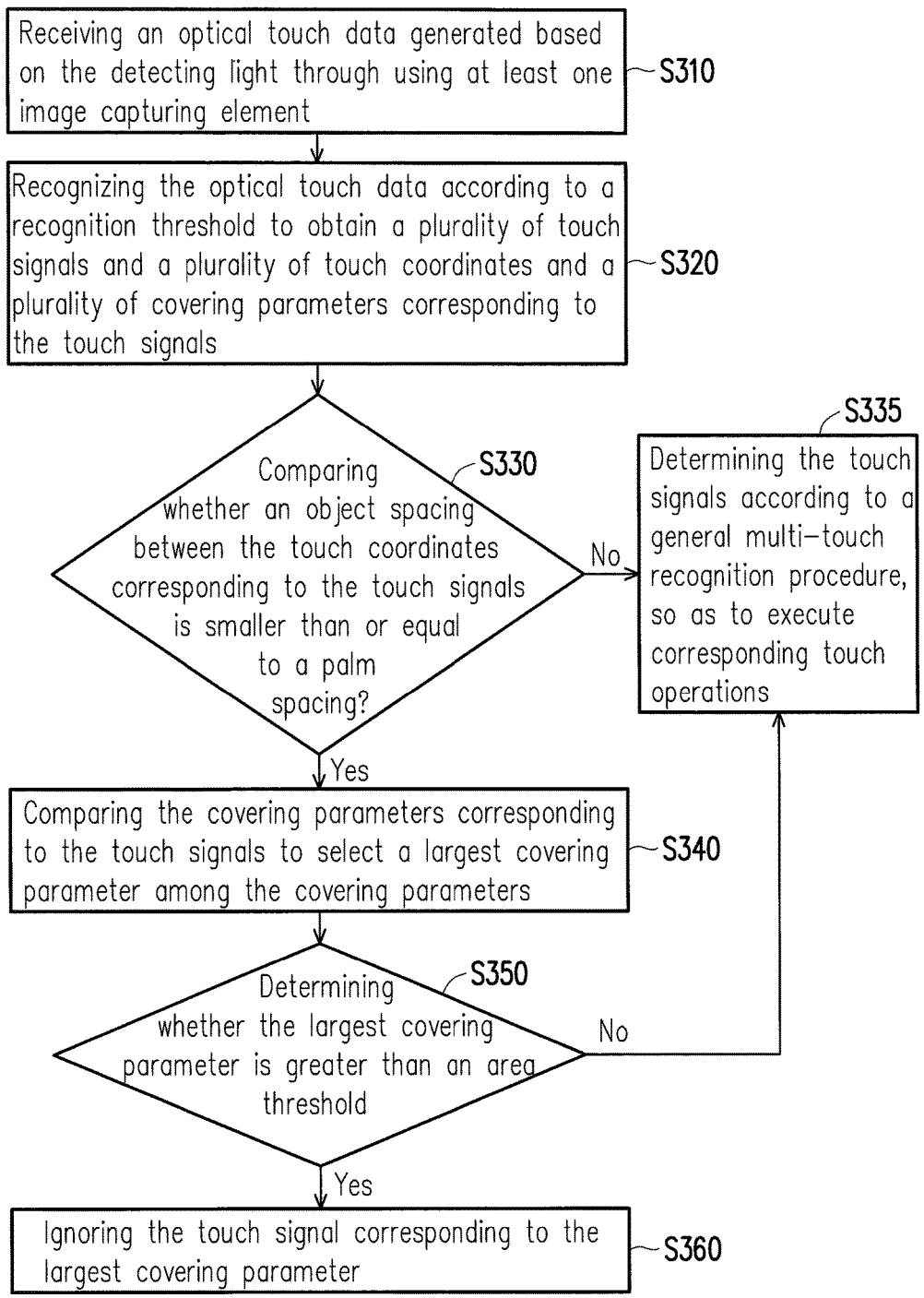
FIG. 3 is a flow chart illustrating a touch signal determining method of an optical touch sensing device 200 according to an embodiment of the invention.
Figure 4:
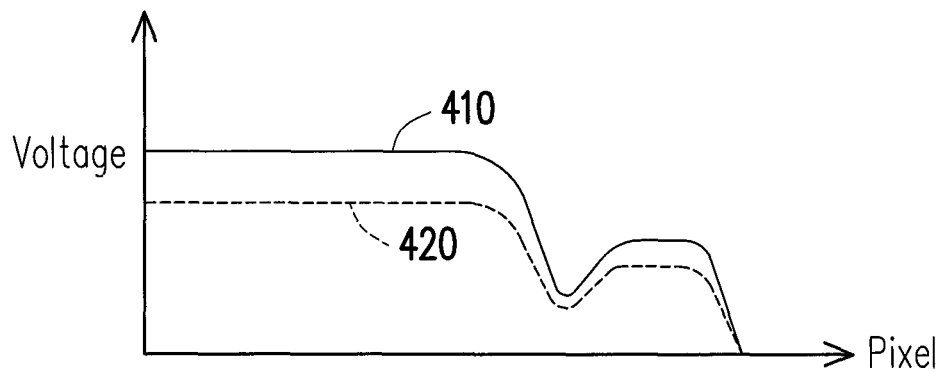
FIG. 4 and FIG. 5 are schematic diagrams illustrating an optical touch data captured by an image capturing element.
Figure 5:
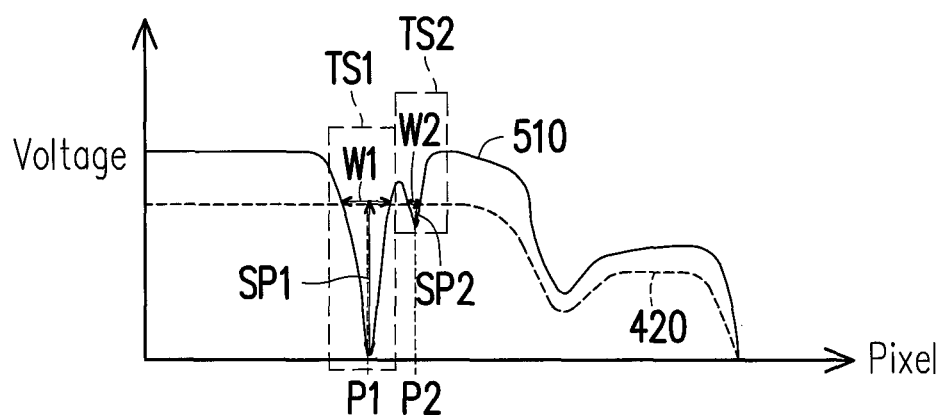

FIG. 3 is a flow chart illustrating a touch signal determining method of an optical touch sensing device 200 according to an embodiment of the invention. In the present embodiment, the touch signal determining method is mainly achieved by the processing unit 240 shown in FIG. 2B. Referring to FIG. 2A, FIG. 2B and FIG. 3 at the same time, in step S310, the processing unit 240 controls the light source module 220 in the optical engine module 210 to emit the detecting light, and receives the optical touch data generated based on the detecting light through using the at least one image capturing element 230 in the optical engine module 210. The optical touch data may be as shown in FIG. 4 and FIG. 5. FIG. 4 and FIG. 5 are schematic diagrams illustrating an optical touch data captured by an image capturing element. X-axis as shown in FIG. 4 and FIG. 5 uses "pixel" as a distance unit of the optical touch data, while Y-axis uses "voltage" converted from the light intensity sensed by the image capturing element 230 as the signal strengths of the touch signals. FIG. 4 shows an optical touch data 410 generated when there is no touch object presented on the touch surface 250 of the optical touch sensing device 200. In the present embodiment, the processing unit 240 uses the optical touch data 410 shown in FIG. 4 as an original brightness, and accordingly uses a certain proportion of (e.g., 75% of the brightness in the optical touch data 410) of the original brightness (optical touch data 410) on the Y-axis as a recognition threshold 420. The processing unit 240 may use the recognition threshold 420 as a basis for determining the touch signals from the optical touch data.

FIG. 5 shows an optical touch data 510 generated when there are two touch objects presented on the touch surface 250 of the optical touch sensing device 200. Herein, FIG. 5 is included to illustrate the subsequent embodiment, and to provide a further understanding of process steps shown in FIG. 3. Referring to FIG. 3 and FIG. 5 at the same time, in step S320 of FIG. 3, the processing unit 240 recognizes the optical touch data 510 according to the recognition threshold 410 to obtain a plurality of touch signals TS1 and TS2 and a plurality of touch coordinates P1 and P2 and a plurality of covering parameters W1 and W2 corresponding to the touch signals TS1 and TS2. In detail, in the present embodiment, the optical touch sensing device 200 adopting the "touch object covering" mode may use a covering region having weaker brightness in the optical touch data 510 to recognize the coordinates and the signal strengths of the touch signals. Therefore, the processing unit 240 in FIG. 2B may use the recognition threshold 410 to define a critical value of an optical touch signal. Regions lower than the recognition threshold 410 may be determined as the touch signals, such as the touch signals TS1 and TS2.

In the present embodiment, after recognizing the touch signals TS1 and TS2, the processing unit 240 may also obtain the touch coordinates and the covering parameters corresponding to each of the touch signals. The touch coordinates may be two-dimensional coordinates calculated by the processing unit 240 of FIG. 2B using the triangulation method. Herein, the touch coordinates of the touch signal TS1 are referred to as P1, and the touch coordinates of the touch signal TS2 are referred to as P2. In the present embodiment, the touch signal TS1 is corresponded to the touch coordinates P1 and a covering parameter W1; and the touch signal TS2 is corresponded to the touch coordinates P2 and a covering parameter W2. The two touch signals TS1 and TS2 of the present embodiment are only provided as examples; and those skilled in the art may also obtain three ore more touch signals according to the present disclosure.

It is to be noted that, the covering parameters W1 and W2 corresponding to the touch signals TS1 and TS2 are configured to represent the touch areas corresponding to the touch signals TS1 and TS2. In the present embodiment, the covering parameters W1 and W2 may respectively be X-axis widths of the touch signals TS1 and TS2 above the recognition threshold 420 in the optical touch data. In other embodiments, the covering parameters may also be a covering area formed by interleaving two optical touch data obtained by the processing unit 240 through using two image capturing elements 230 with covering signals corresponding to the touch object. Accordingly, the covering parameters corresponding to the touch signals are configured to represent the magnitudes of the covering area corresponding to the touch object.

If only one touch signal is recognized in step S320, then processing unit 240 would determine the location and the signal strength of the touch signal according to a general touch signal recognition procedure, so as to execute a corresponding touch action. On the other hand, when the processing unit 240 obtains two or more than to touch signals in step 320, then it is to progress into step S330 and continues with the subsequent steps.

In step S330, the processing unit 240 compares whether an object spacing between the touch coordinates P1 and P2 corresponding to the touch signals TS1 and TS2 is smaller than or equal to a palm spacing. In other words, the optical touch sensing device 200 may calculate the object spacing between the touch coordinates P1 and P2 through using the precise touch coordinates P1 and P2 of the touch signals TS1 and TS2 calculated by the triangulation method, and determines whether the object spacing is smaller than or equal to a palm length of a general user so as to know whether the two touch signals TS1 and TS2 are respectively a finger touch object and a palm touch object. The palm spacing may be a preset parameter, and the user may also adjust the value of the palm spacing according to the needs.

When the object spacing between the touch signals TS1 and TS2 is greater than the palm spacing, it indicates that the two touch signals TS1 and TS2 are spaced too far from each other and thus would not be caused by different touch objects formed by a finger and a palm of a hand of a single user, and may fall under a condition that the same user is simultaneously using the left hand and the right hand to perform touch actions or a condition that two different users are respectively performing the touch actions using their own fingers. Therefore, when the answer to the question in step S330 is "NO", then continues to step S335, whereby the processing unit 240 determines the locations and the signal strengths of the two touch signals TS1 and TS2 according to a general multi-touch recognition procedure, so as to execute the corresponding touch operations.

Relatively, when the object spacing between the touch signals TS1 and TS2 is smaller than or equal to the palm spacing, it indicates that the touch signals TS1 and TS2 are comparatively close to each other and may be the different touch objects formed by the finger and the palm of the same hand of a single user. Therefore, when the object spacing between the touch signals TS1 and TS2 is smaller than or equal to the palm spacing (namely, being step S330), then the process flow progresses into step S340, whereby the processing unit 240 compares the covering parameters W1 and W2 corresponding to the touch signals TS1 and TS2 to select a largest covering parameter among the covering parameters. The reason for selecting the largest covering parameter among the covering parameters is hoping to find the suspected palm touch object from the covering parameters that are related to the touch areas of the touch signals.

In the present embodiment, the processing unit 240 may determine whether to ignore the touch signal corresponding to the largest covering parameter according to a relationship between the largest covering parameter and an area threshold. In detail, in step S350, the processing unit 240 determines whether the largest covering parameter is greater than an area threshold. The term "area threshold" provided herein may be referred to a fixed area value, or may be obtained by multiplying a second largest covering parameter among the covering parameters with a magnification value (e.g., 1 to 1.5 times). The latter approach is provided under the consideration that when the largest covering parameter is greater than the second largest covering parameter by several times, the touch signal corresponding to the largest covering parameter would have higher chance being caused by the palm touch object, and thus the process flow progresses from step S350 into step S360, whereby the processing unit 240 in the optical touch sensing device 200 cancels or ignores the touch signal corresponding to the largest covering parameter. Contrarily, when a difference in value between the largest covering parameter and the second largest covering parameter are not large, then the touch signals corresponding to the largest covering parameter and the second largest covering parameter are both very likely to be caused by the finger touch objects. If so, then the process flow progresses from step S350 into step S335, whereby the processing unit 240 executes the corresponding operations through using the general multi-touch recognition procedure.

When the largest covering parameter is greater than the area threshold, it indicates that an area covered by the touch signal corresponding to the largest covering parameter is far greater than a preset covering area formed by the finger touch object. That is, the touch signal corresponding to the largest covering parameter may be caused by the palm touch object. Therefore, the process flow progresses from step S350 into step S360, whereby the processing unit 240 ignores the touch signal corresponding to the largest covering parameter so as to avoid an inadvertent palm touch. In contrast, when the largest covering parameter is smaller than or equal to the area threshold, the processing unit 240 is unable to determine by which touch object has the touch signal corresponding to the largest covering parameter been caused, and thus the process flow progresses from step S350 into step S335, whereby the processing unit 240 executes the touch operations corresponding to the touch signals according to the general multi-touch recognition procedure.

Figure 6A:
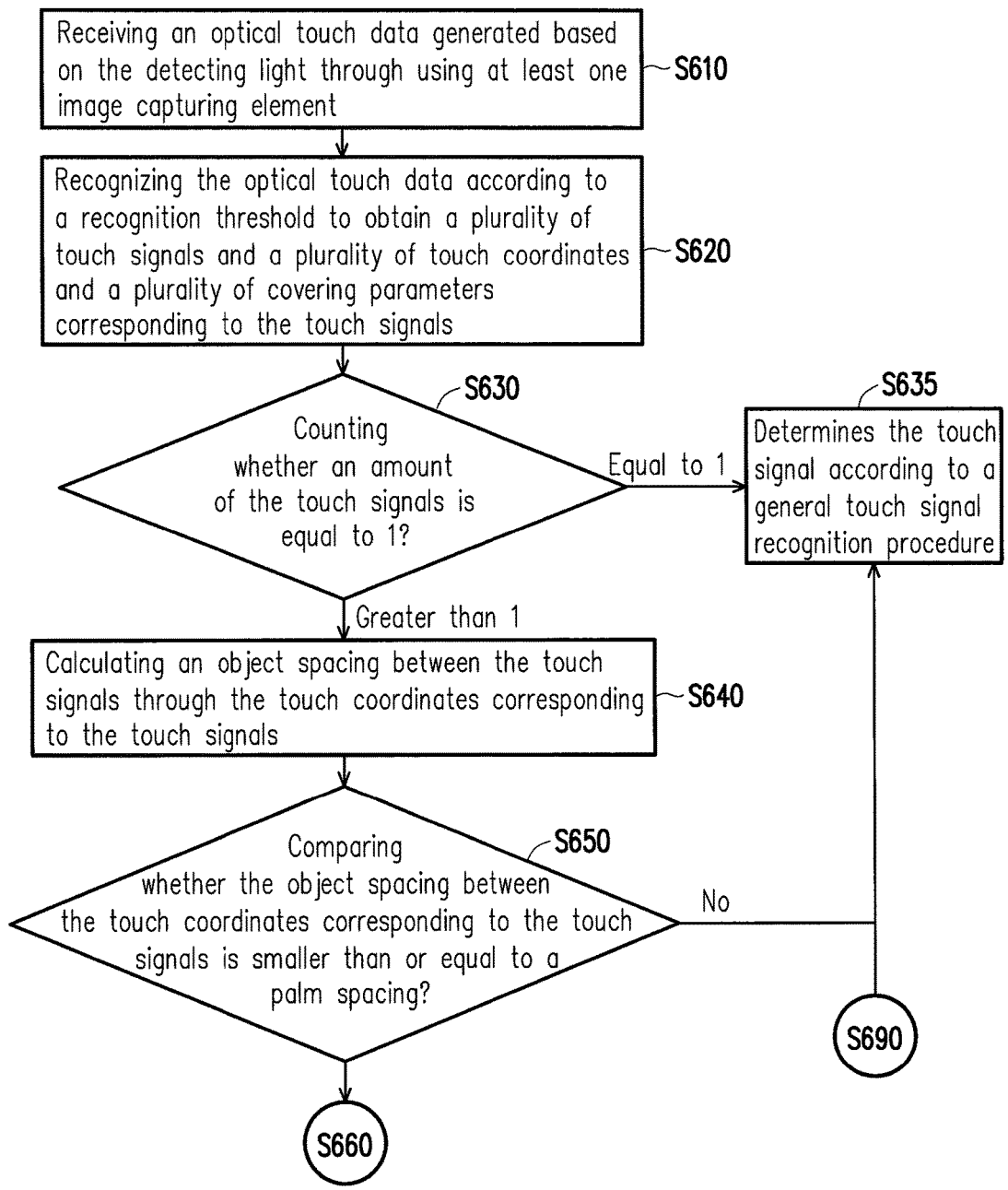
FIG. 6A and FIG. 6B are flow charts illustrating a touch signal determining method of an optical touch sensing device according to another embodiment of the invention.
Figure 6B:
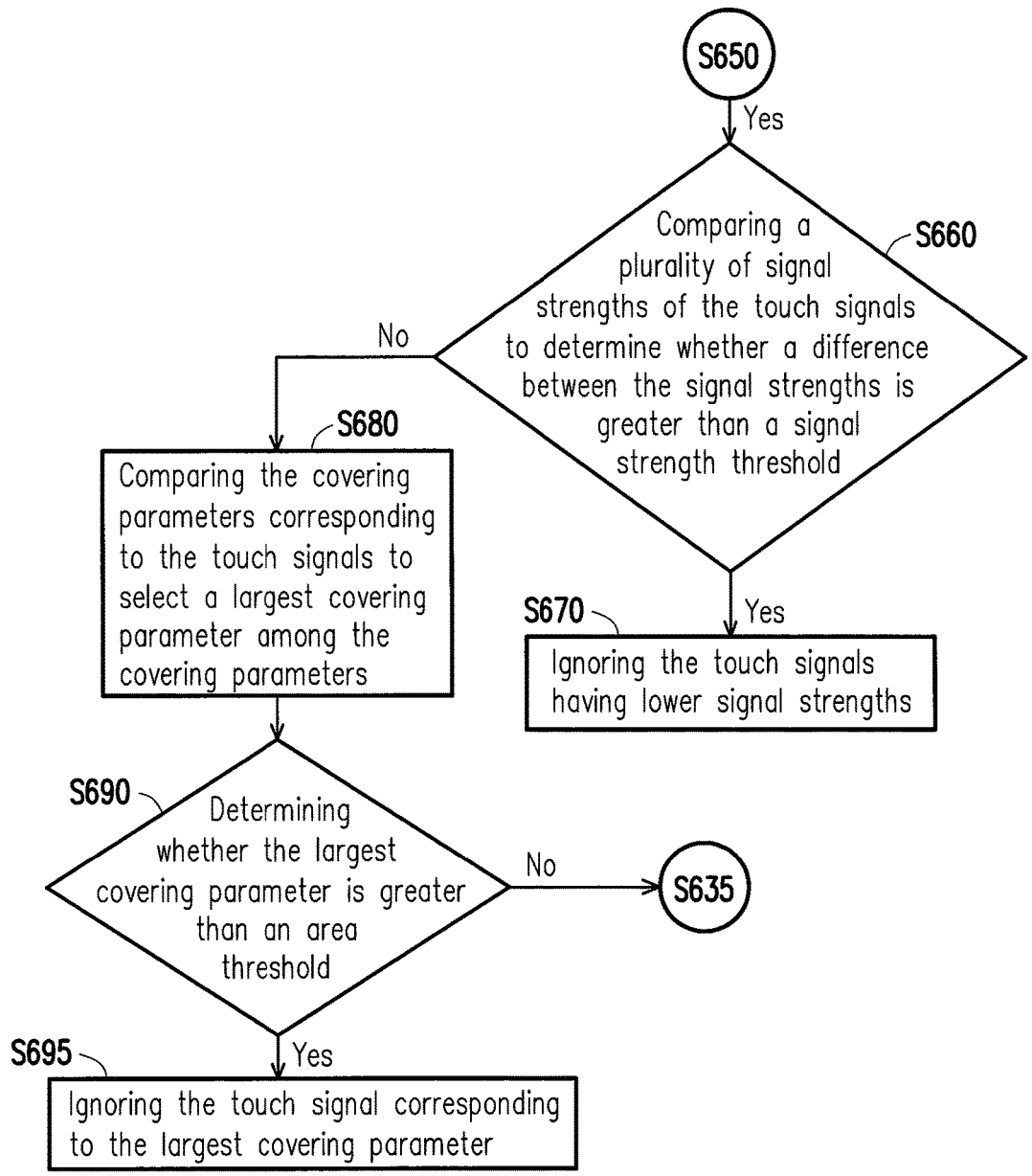

Accompanying by FIG. 2A, FIG. 2B and FIGS. 6A-6B, one embodiment of the invention further provides another touch signal determining method for optical touch sensing device 200. FIG. 6A and FIG. 6B are flow charts illustrating another touch signal determining method of the optical touch sensing device 200 according to one embodiment of the invention. A difference between FIGS. 6A-6B and FIG. 3 lies in that, there are several additional steps provided in FIGS. 6A-6B, so that the optical touch sensing device 200 can be more accurate in determining an inadvertent palm touch.

Referring to FIG. 2A, FIG. 2B and FIGS. 6A-6B at the same time, and taking the optical touch data 510 in FIG. 5 as an example. In step S610, the processing unit 240 controls the light source module 220 in the optical engine module 210 to emit the detecting light, and receives the optical touch data generated based on the detecting light through using the at least one image capturing element 230 in the optical engine module 210. In step S620, the processing unit 240 recognizes the optical touch data 510 according to the recognition threshold 410 to obtain the touch signals TS1 and TS2 and the touch coordinates P1 and P2 and the covering parameters W1 and W2 corresponding to the touch signals TS1 and TS2. In step S630, the processing unit 240 counts whether an amount of the touch signals is equal to 1. When the amount of the touch signals is equal to 1, the process flow progresses from step S630 into step S635, whereby the processing unit 240 determines the location and the signal strength of the touch signal according to the general touch signal recognition procedure, so as to execute the corresponding operation. Contrarily, when the amount of the touch signals does not equal to 1, it indicates that the amount of the touch signals is two or more than two, and thus the process flow progresses from step S630 into step S640.

In step S640, the processing unit 240 calculates the object spacing between the touch signals TS1 and TS2 through the touch coordinates P1 and P2 corresponding to the touch signals TS1 and TS2. In step S650, the processing unit 240 compares whether the object spacing between the touch coordinates corresponding to the touch signals is smaller than or equal to the palm spacing. When the object spacing between the touch signals TS1 and TS2 is greater than the palm spacing, the process flow progresses into step S635, whereby the touch signals are determined according to the general multi-touch recognition procedure, so as to execute the corresponding operations. Contrarily, when the object spacing between the touch signals TS1 and TS2 is smaller than or equal to the palm spacing, the process flow progress from step S650 into step S660.

In step S660, the processing unit 240 compares the signal strengths of the touch signals to determine whether a difference between the signal strengths is greater than a signal strength threshold. The term "signal strengths" of the touch signals can be referred to Y-axis depths in the touch signals, namely, the light intensity. In other words, the signal strength of the touch signal TS1 is determined with a depth SP1; and the signal strength of the touch signal TS2 is determined with a depth SP2. The term "signal strength threshold" may be referred to a preset value configured to reserve the touch signals having similar signal strengths. If the difference between the touch signals is greater than the signal strength threshold, then it indicates that the signal strengths of some of the touch signals are too small, and thus the process flow may progress from step S660 into step S670, whereby the processing unit 240 ignores the touch signals having lower signal strengths.

If the difference between the touch signals is smaller than or equal to the signal strength threshold, then it indicates that the signal strengths of some of the touch signals are close, and thus the process flow may progress from step S660 into step S680, whereby the processing unit 240 compares the covering parameters corresponding to the touch signals to select the largest covering parameter among the covering parameters. In step S690, the processing unit 240 determines whether the largest covering parameter is greater than the area threshold. When the largest covering parameter is greater than the area threshold, the process flow progresses from S690 into step S695, whereby the processing unit 240 in the optical touch sensing device 200 cancels or ignores the touch signal corresponding to the largest covering parameter. Contrarily, when the largest covering parameter is smaller than or equal to the area threshold, the process flow progresses from step S690 into step S635, whereby the processing unit 240 executes the corresponding operation through using the general multi-touch recognition procedure.

After step S690, relative embodiments complying with the invention may further include some additional steps for improving the accuracy of the optical touch sensing device in determining the inadvertent palm touch. In the present embodiment, the processing unit 240 of FIG. 2B compares the covering parameters corresponding to the touch signals to select the second largest covering parameter among the covering parameters. The term "second largest covering parameter" is referred to the covering parameter having the second largest value among the covering parameters. Then, the processing unit 240 determine a relationship between the touch coordinates of the touch signal (known as Ax) corresponding to the largest covering parameter and the touch coordinates of the touch signal (known as Ay) corresponding to the second largest covering parameter, so as to determine whether a positional relationship between the touch signal Ax and the touch signal Ay matches the location of the user's palm. In other words, when the touch coordinates of the touch signal Ax corresponding to the largest covering parameter are located below the touch coordinates of the touch signal Ay corresponding to the second largest covering parameter, it indicates that the touch signal Ax located in the below has a larger covering region than the touch signal Ay, and thus matches the condition of having an inadvertent touch caused by the user's palm. Therefore, the processing unit 240 may then ignore the touch signal Ax corresponding to the largest covering parameter. Contrarily, when the touch coordinates of the touch signal Ax corresponding to the largest covering parameter is not located below the touch coordinates of the touch signal Ay corresponding to the second largest covering parameter, the processing unit 240 may determine the touch signals TS1 and TS2 according to the general multi-touch recognition procedure, so as to execute the corresponding operations.

In summary, the optical touch sensing device provided in the embodiment of the invention determines whether the spacing between the touch signals falls within the palm spacing through the touch coordinates of the touch signals, and then determines the touch signal with larger area by using the covering widths or the covering areas occupied by the touch signals in the optical touch data, so as to determine the touch signal with larger area as being generated by a palm or other large touch object. Accordingly, the optical touch sensing device may be used to determine whether there exists a condition of inadvertent palm touching, and may ignore the inadvertent touch signal.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical touch sensing device, comprising:
    a light source module, disposed on a touch surface and providing a detecting light to the touch surface;
    at least one image capturing element, capturing an optical touch data along the touch surface based on the detecting light; and
    a processing unit, coupled to the at least one image capturing element to receive the optical touch data, recognizing the optical touch data according to a recognition threshold to obtain a plurality of touch signals and a plurality of touch coordinates and a plurality of covering parameters corresponding to the touch signals, wherein each covering parameter is positively related to a spatial occupation of the corresponding touch signal, and each touch signal is corresponding to one of the touch coordinates and one of the covering parameters,
    wherein the processing unit determines an object spacing between each two touch coordinates and selects a plurality of candidate touch signals from the touch signals according to the object spacing, wherein the object spacing between each two touch coordinates corresponding to the candidate touch signals is smaller than or equal to a palm spacing,
    wherein after the candidate touch signals have been selected, the processing unit obtains an area threshold by multiplying the second largest covering parameter of the candidate touch signals by a magnification value which is greater than 1 and is not greater than 1.5,
    wherein the processing unit determines whether the largest covering parameter of the candidate touch signal is greater than the area threshold, and ignores the candidate touch signal having the largest covering parameter when it is determined that the largest covering parameter is greater than the area threshold.

2. The optical touch sensing device as recited in claim 1, wherein the processing unit compares a plurality of signal strengths of the candidate touch signals, and ignores the candidate touch signal corresponding to the lower signal strength when a difference between the signal strengths is greater than a signal strength threshold.

3. The optical touch sensing device as recited in claim 1, wherein after obtaining the touch signals and the touch coordinates and the covering parameters corresponded thereto, the processing unit counts an amount of the touch signals, and executes a touch action according to the touch signal when the amount is equal to 1.

4. The optical touch sensing device as recited in claim 1, wherein the processing unit determines a relative positional relationship between the touch coordinates of the candidate touch signal having the largest covering parameter and the touch coordinates of the candidate touch signal having the second largest covering parameter, and ignores the candidate touch signal having the largest covering parameter when the touch coordinates of the candidate touch signal having the largest covering parameter are located below the touch coordinates of the candidate touch signal having the second largest covering parameter.

5. The optical touch sensing device as recited in claim 1, further comprising:
    at least one edge strip, disposed around the touch surface for reflecting, diverging or absorbing the detecting light.

6. The optical touch sensing device as recited in claim 1, wherein each of the covering parameters is a width value of the corresponding touch signal in the optical touch data or an area value formed by using at least to image capturing elements.

7. A touch signal determining method for an optical touch sensing device, comprising:
    receiving an optical touch data based on a detecting light on a touch surface through using at least one image capturing element;
    recognizing the optical touch data to obtain a plurality of touch signals and a plurality of touch coordinates and a plurality of covering parameters corresponding to the touch signals according to a recognition threshold, wherein each covering parameter is positively related to a spatial occupation of the corresponding touch signal, and each touch signal is corresponding to one of the touch coordinates and one of the covering parameters;
    determining an object spacing between each two touch coordinates;
    selecting a plurality of candidate touch signals from the touch signals according to the object spacing, wherein the object spacing between each two touch coordinates corresponding to the candidate touch signals is smaller than or equal to a palm spacing;
    after the candidate touch signals have been selected, obtaining an area threshold by multiplying the second largest covering parameter of the candidate touch signals by a magnification value which is greater than 1 and is not greater than 1.5;

determining whether the largest covering parameter of the candidate touch signal is greater than the area threshold; and ignoring the candidate touch signal having the largest covering parameter when it is determined that the largest covering parameter is greater than the area threshold.

8. The touch signal determining method as recited in claim 7, further comprising:

comparing a plurality of signal strengths of the candidate touch signals; and ignoring the candidate touch signal corresponding to the lower signal strength when a difference of between the signal strengths is greater than a signal strength threshold.

9. The touch signal determining method as recited in claim 7, wherein after obtaining the touch signals and the touch coordinates and the covering parameters corresponded thereto, further comprising:

counting an amount of the touch signal; and executing a touch action according to the touch signal when the amount is equal to 1.

10. The touch signal determining method as recited in claim 7, further comprising:

determining a relative positional relationship between the touch coordinates of the candidate touch signal having the largest covering parameter and the touch coordinates of the candidate touch signal having the second largest covering parameter; and ignoring the candidate touch signal having the largest covering parameter when the touch coordinates of the candidate touch signal having the largest covering parameter are located below the touch coordinates of the candidate touch signal having the second largest covering parameter.

11. The touch signal determining method as recited in claim 7, wherein each of the covering parameters is a width value of the corresponding touch signal in the optical touch data or an area value formed by using at least to image capturing elements.

\* \* \* \* \*